L. G. HANMER.
METHOD OF MAKING AUTOMOBILE RADIATORS.
APPLICATION FILED AUG. 9, 1917.
1,369,806.
Patented Mar. 1, 1921.
3 SHEETS—SHEET 2.
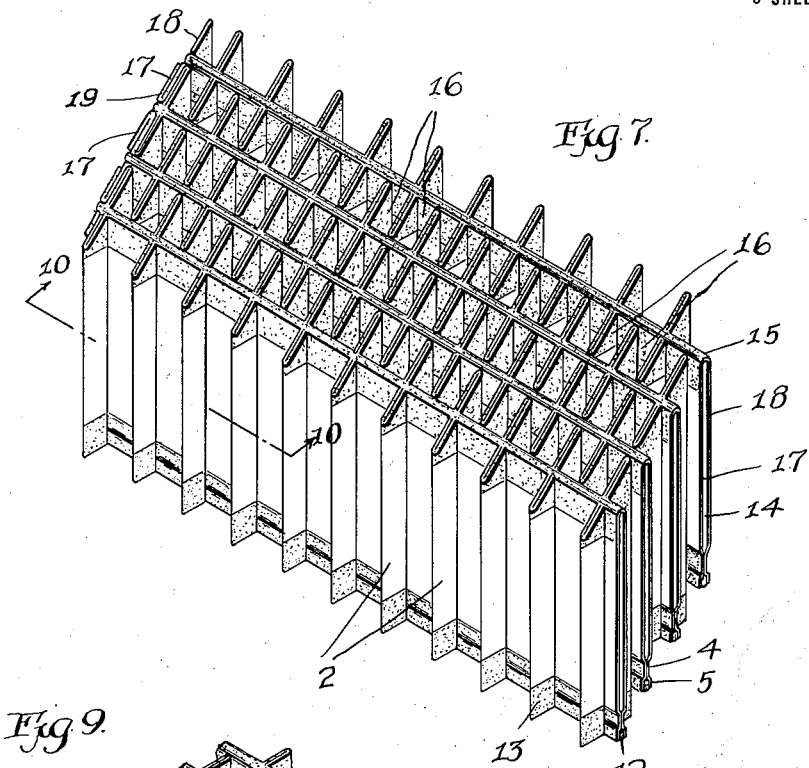
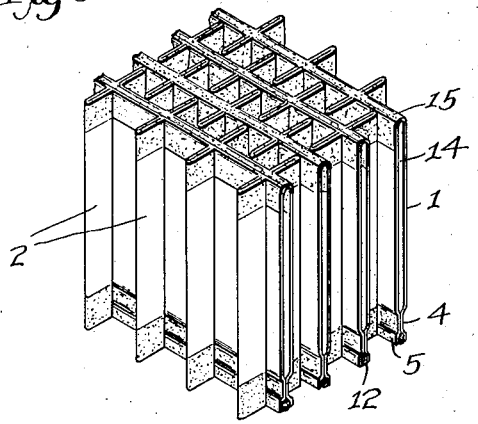
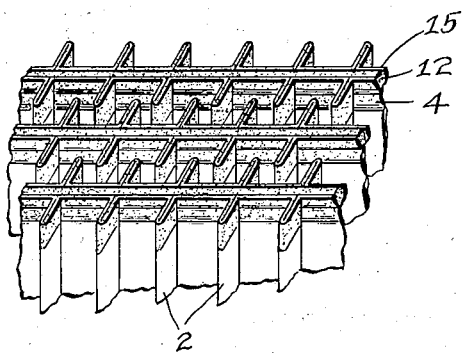
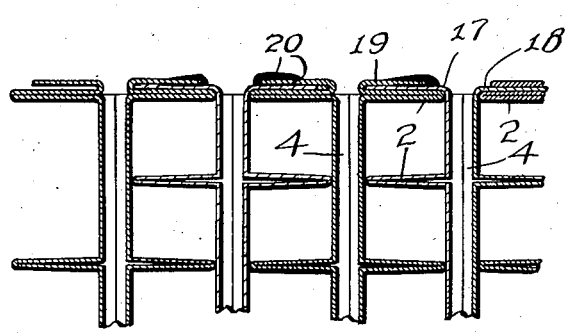
INVENTOR:
Laurence G. Hanmer
BY
Chas. M. Chapman
ATTORNEY

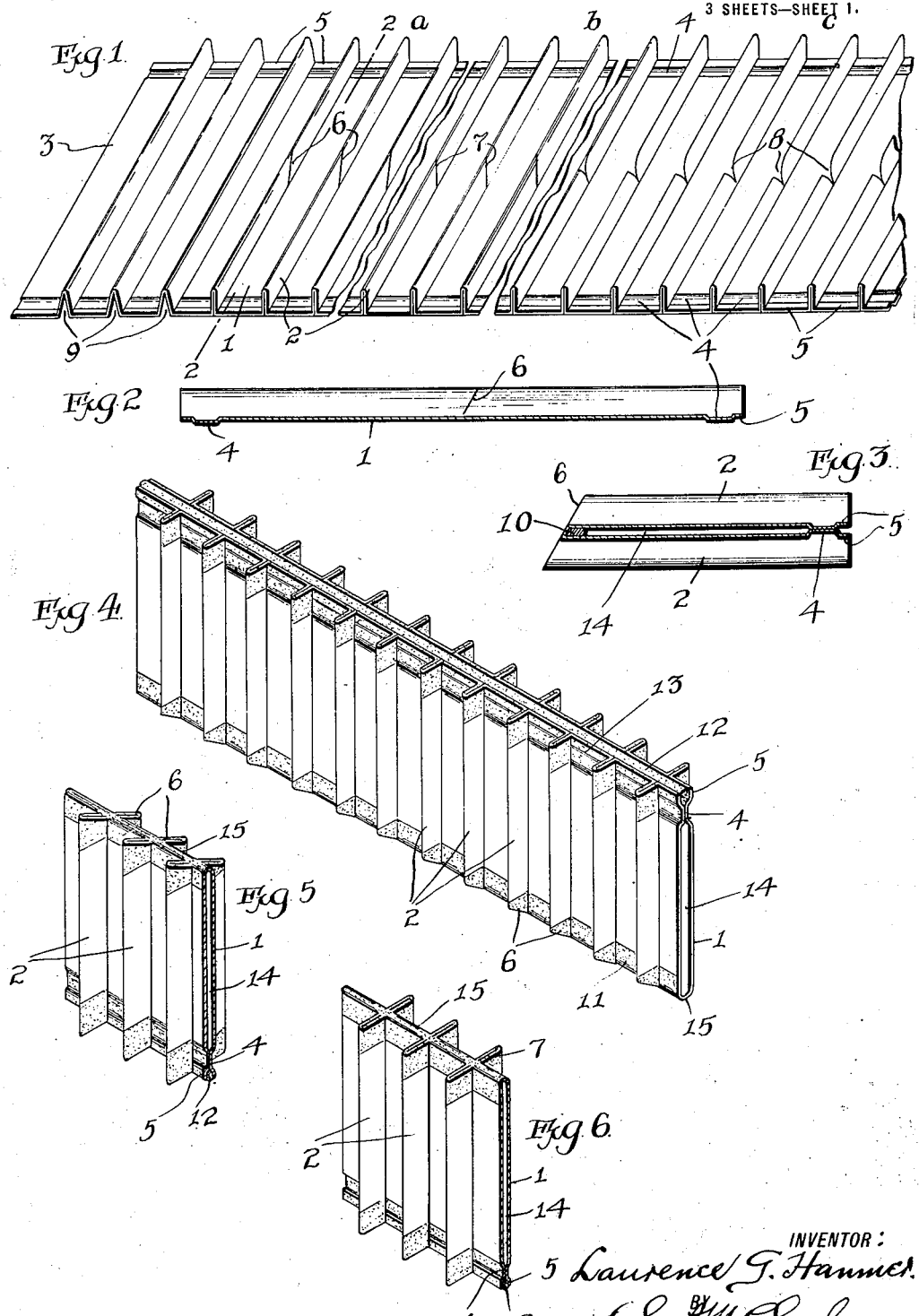

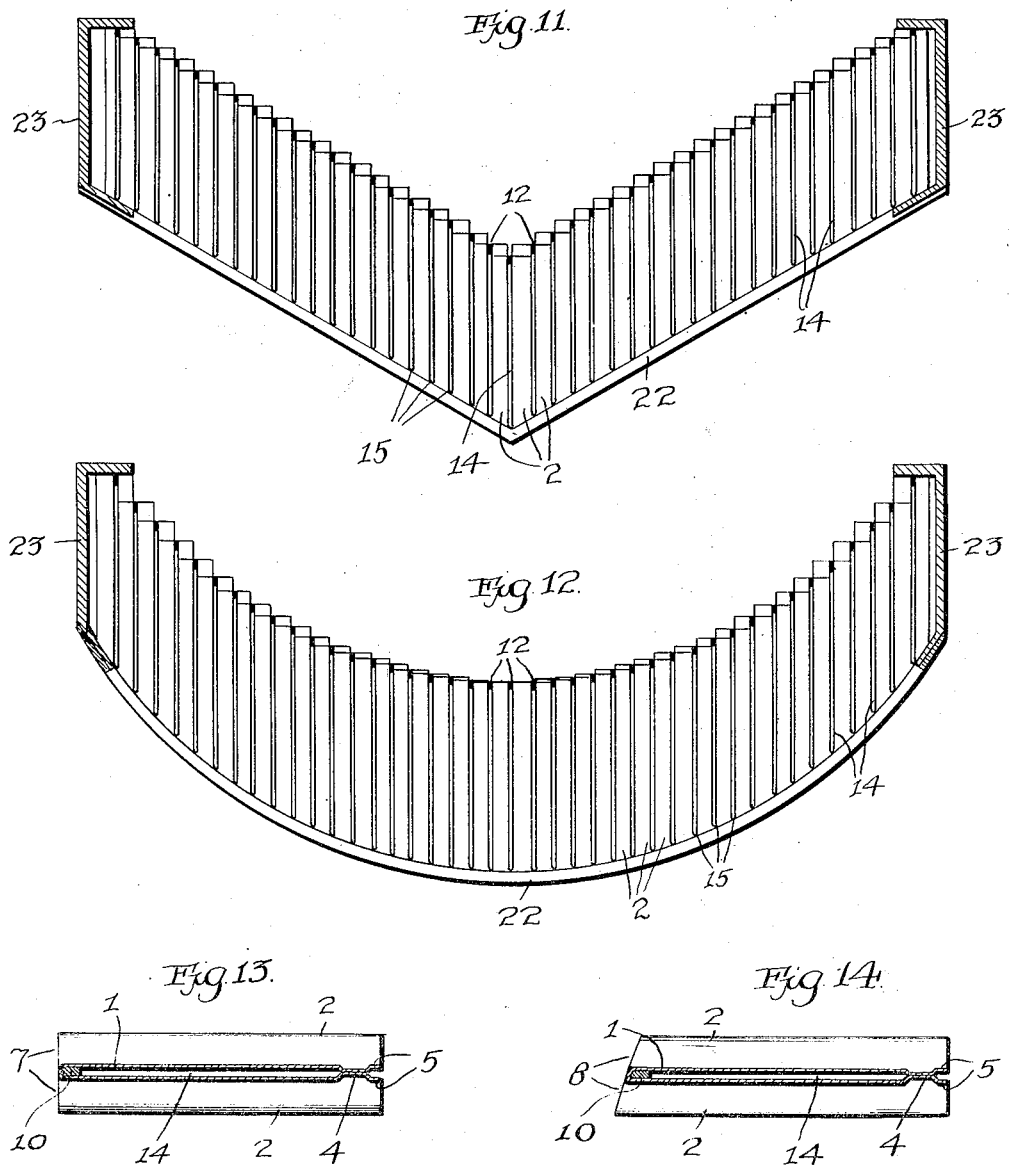

UNITED STATES PATENT OFFICE.

LAURENCE G. HANMER, OF BROOKLYN, NEW YORK, ASSIGNOR TO THE A-Z COMPANY, OF NEW YORK, N. Y., A CORPORATION OF NEW YORK.

METHOD OF MAKING AUTOMOBILE-RADIATORS.

1,369,806.　　　　　Specification of Letters Patent.　　Patented Mar. 1, 1921.

Application filed August 9, 1917. Serial No. 185,226.

*To all whom it may concern:*

Be it known that I, LAURENCE G. HANMER, a citizen of the United States, residing in the borough of Brooklyn, county of Kings, and State of New York, have invented a new and useful Improvement in Methods of Making Automobile-Radiators, of which the following is a description.

This invention has reference to radiators or coolers for use in connection with hydrocarbon engines and, particularly, has reference to such devices as are specially adapted for automobiles in connection with the water system thereof.

Among the objects of my invention may be noted the following: to provide an expeditious, economical and effective method for producing automobile radiators of special form or type, as hereinafter explained; to produce a cooler or radiator for hydrocarbon engines wherein the face, or exposed surface, may be of regular or irregular form; to produce an automobile radiator with a V-shaped or a rounded face in accordance with an expeditious, simple and economical method; to produce an automobile radiator of irregular form from a plurality of tube-units, having a folded or seamless edge constituting a part of the face of the radiator; to provide a tube-unit, or radiator unit, and a novel method of making the same, the unit being adapted to be incorporated in an automobile cooler of straight, round, or irregular facial form; to provide a method of making a strip-unit adapted to be converted into a tube-unit to be ultimately embodied in an automobile radiator of the several forms noted; and to provide a method of making a strip-unit convertible into a tube-unit, or radiator unit, for automobile radiators, having certain novel characteristics adapting it for coolers, condensers, or radiators having regular or irregular facial form.

With the above objects in view and others which will be detailed during the course of this description, my invention consists in the article, the method of making the same, and in certain elements, features and combinations thereof hereinafter described and claimed.

In order that my invention may be clearly understood, I have provided drawings wherein:

Figure 1 is a perspective view of a portion of a strip-unit, parts being broken away to curtail the view and the unit illustrating the manner in which the plates or ribs may be cut, in order to produce the tube-units of various forms and the radiator structures of different facial forms;

Fig. 2 is a section substantially on the line 2—2, Fig. 1;

Fig. 3 is a section substantially on the line 2—2 of Fig. 1, after the strip-unit has been folded on the line of the cut of the ribs or plates, the figure showing, in section, the folding bar over which the fold is made;

Fig. 4 is a perspective view of a complete tube or radiator unit;

Fig. 5 is a perspective view of a section of the radiator unit of Fig. 4, the view being inverted to show the bottom edge of Fig. 4 which becomes in use the face or front of the tube-unit;

Fig. 6 is a view similar to Fig. 5, showing another form of tube-unit made from a strip-unit slashed or cut according to the illustration thereof at the section *b*, Fig. 1;

Fig. 7 is a perspective view showing a plurality of tube-units of the form of Figs. 4 and 5 and illustrating the manner in which a V-faced radiator, such as shown in Fig. 11, is built up;

Fig. 8 is a perspective view of a section of the group of tube-units shown in Fig. 7, but illustrating the bottom of the Fig. 7 group which becomes the back of the completed radiator;

Fig. 9 is a view similar to Fig. 7 made up of a plurality of tube-units or radiator units such as shown in Fig. 6, this figure showing how a flat front radiator is made in accordance with my invention;

Fig. 10 is a section substantially on the line 10—10, Fig. 7, illustrating the manner in which the tube-units are joined together at their ends by overlapping portions of adjacent tube-units;

Fig. 11 is a transverse section, looking downwardly, of a V-faced radiator made according to my invention from tube-units such as shown in Fig. 4;

Fig. 12 is a view similar to Fig. 11, illustrating the manner in which a radiator with a round face is made from tube-units made up, primarily, of strip-units, the ribs or plaits of which are slashed or cut in accordance with section *c* of Fig. 1;

Fig. 13 is a view similar to Fig. 3, showing a folded strip-unit the ribs of which have been slashed or cut at a right-angle to the length of the rib and to the surface of the strip as indicated in section $b$, Fig. 1;

Fig. 14 is a view similar to Fig. 13 showing a strip-unit, the ribs of which have been cut or slashed so as to remove a section thereof as indicated in section $c$, Fig. 1.

Primarily, it should be understood that I first construct a strip-unit. This strip-unit is folded so as to produce a tube-unit or radiator-unit. The tube-units or radiator-units are capable of being used singly as a radiator or condenser; but, according to my invention, are grouped to make a cooler, condenser or radiator for hydrocarbon engines. The frame parts of the radiator are then applied. In the following description the various steps of the method and the characteristic features of the units and of the completed article will be fully set forth.

Referring to the drawings, the numeral 1, Fig. 1, indicates a thin, flexible sheet or strip of metal, such as copper or brass, from which honeycomb radiators for automobiles are usually made. This strip may be of indefinite length or may be of predetermined length; and in the manipulation of the same, may be run from a roll carried upon a reel, cylinder, or other support as is well-known in the art. The strip 1 is plaited and treated in accordance with the showing in Fig. 1, wherein it will be seen that the same is provided with a plurality of equally spaced plaits or ribs 2 arranged parallel to each other transversely of and perpendicularly to the surface of the strip. The plaits or ribs, when completed, are preferably tightly compressed together to form closed and rigid plaits; but, said plaits may be made in the form of open-plaits, that is, with the walls thereof not compressed together, thus providing for the passage and percolation of the water within the plaits and over the inner surfaces of the tube-unit adjacent the open sides of the plaits. The strip-unit is made of predetermined length, according to the height to be given the radiator when completed, and the strip-unit is also made of predetermined width, according to the thickness or depth of the radiator from front to rear. The opposite ends of the strip-unit are left flat or without plait or crimp, as at 3, so as to make an overlapping joint as hereinafter described. The strip-unit, between the ends of the ribs or plaits, is provided with offsets 4 near the marginal edges, leaving at the edges the narrow margins 5 in the plane with the surfaces of the body of the strip-unit,—see Fig. 2. The offset portions extend parallel with the marginal edges of the strip-unit in continuity from plait to plait and may be of any desired width transversely of the strip. The objects of these two features of construction will be presently set forth. The strip-unit is also treated by slashing or cutting each of the ribs midway its length from top to bottom thereof, or nearly so, without necessarily penetrating the body of the material, although if, in slashing or cutting the plaits, the body material should be penetrated, it will make no material difference as will be presently understood. The slashes or cuts in the ribs or plaits may be produced at any desired degree of inclination from the perpendicular either way, according to the results ultimately to be produced in the facial form of the radiator in which the tube-units are incorporated, as shown at 6, for example in section $a$, Fig. 1. Or the slashes or cuts may be made in the ribs or plaits at a perfect right-angle to the latter, as shown at 7 in section $b$, Fig. 1, so as to make a flat face radiator. Or a section may be cut from the ribs or plaits of any desired form, as shown at 8 in section $c$, Fig. 1, according to the shape to be given the radiator face, as for example a round face as shown in Fig. 12. The plaits or ribs are formed in the strip 1 in accordance with a well-known method which gives to the material an initial bend 9 forming a wide-open plait, as shown at the extreme left of Fig. 1, said open plaits being subsequently compressed to make the finished ribs or plaits indicated by 2, Fig. 1. The various characteristic features thus given to the strip-unit may be imparted or produced simultaneously, the dies used having interacting parts for producing the offsets 4 and retaining the marginal flanges 5 at the same time the ribs or plaits are formed and the slashing or cutting of the latter is effected.

The strip-unit described in the foregoing, and shown in Figs. 1 and 2, is folded lengthwise, or transversely of the plaits or ribs, along the line of the slashes or cuts in the latter until the offsets 4 are in engagement with each other, see Fig. 3, the folding being accomplished uniformly and evenly throughout the length of the strip by means of a special folding machine and by laying a folding-bar 10 of proper shape and diameter against the flat surface of the strip-unit opposite the point where the slashes in the ribs or plaits terminate. Thus the strip-unit is folded midway its length at the points of division of the ribs or plaits and the two longitudinal halves of the strip-unit are folded upon each other into parallelism and until the offsets at the marginal edges thereof are in engagement. The folding bar is then removed. A tube-unit is thus partially produced. The next operation is to dip the two longitudinal edges of the tube-unit in a vat or tank of limpid solder. This closes the ends of the plaits or ribs at the fold of the unit and completely covers the folded edge or face thereof. The solder also completely fills the space between the offsets 4 of the tube-unit and the marginal edges 5, where a space is left due to the marginal edges being in a different plane from the contiguous surfaces of the superposed offsets. The solder is prevented from entering the tube or water space of the tube-unit by the close adherence of the opposite offsets and will freely flow from end to end of the tube-unit and form a continuous, substantially circular solder-bar within the space above the line of offsets to the marginal edge of the tube-unit. By this means, the tube-unit is completed, as shown in Fig. 4, wherein the characteristics of the strip-unit and tube-unit, as already described, are indicated by the proper reference characters, and wherein the solder at the folded edge of the tube-unit is indicated by 11, and the continuous solder-bar at the opposite edge of the tube-unit is indicated by 12, the continuous line of solder extending over the edges and down upon the surfaces of the offset being indicated at 13. This structure, fully indicated in Fig. 4, illustrates a complete article of manufacture, to wit: a tube-unit, or radiator-unit, capable of conducting a cooling fluid throughout the length of the unit through its tubular space 14. This tube-unit may be made, obviously, of any size desired and constitutes a radiator, condenser or cooler and can be incorporated, by means of the usual attachments, in any cooling or heating system. It may also be grouped with others of like characteristics as will be presently described, in order to make a cooler, condenser or radiator for hydrocarbon engines. This radiator or tube-unit consists of two walls, each provided with transverse ribs or plaits perpendicular thereto, one end of each rib being at substantially a right-angle to the adjacent marginal edge of the unit and the other end being at an oblique angle of a greater or less degree, as before explained, to the adjacent marginal edge of the unit. Moreover, ribs or plaits of the unit, on opposite sides thereof, are in the same plane perpendicular to the surfaces of the unit or walls of the tube. In order that the relative arrangement of the ribs and folded face of the radiator or tube-unit may be better comprehended, the said unit has been shown in Fig. 5, turned up-side-down from the position of Fig. 4. This shows the angle of the opposite ends of the pairs of ribs relative to the folded face of the tube-unit, which is indicated at 15. If the ribs or plaits 2 are slashed at a right-angle to their length, or perpendicularly to the body of the strip-unit, as shown at 7, in section b, Fig. 1, the tube-unit, treated according to the foregoing method, will have the appearance, shape and form shown in Figs. 6 and 13. If the ribs or plaits 2 are slashed so as to remove therefrom a section substantially such as indicated at 8 in section c, Fig. 1, the tube-unit, treated according to the foregoing method, will have the appearance, shape and form shown in Fig. 14.

In further carrying out my invention, pertaining particularly to automobile radiators of regular and irregular face or form, I group a plurality of tube-units, such as Fig. 4, and as shown, for example, in Fig. 7; that is to say, according to the size of radiator desired, I superpose radiator or tube-units one upon the other with the ribs or plaits thereof in staggered relation, so as to form between each pair of ribs, on each tube-unit, two air tubes 16. The grouping of the tube-units is accomplished by placing the same in a clamping frame, which holds the tube-units in superposed and proper relation rigidly and firmly, and, when the requisite number of tube-units has been grouped, the clamping frame is tightened so that the mass or bundle of tube-units can be manipulated as a whole. The opposite faces, front and back, of the grouped tube-units are then dipped in a vat of limpid solder, thus solidifying the bundle of tube-units into a solid, composite, rigid structure. If the radiator or cooler is to be given a V-shaped face, the strip-units are slashed obliquely, as heretofore explained, and the tube-units made therefrom are grouped as shown in Fig. 7, with the point of the longer edge of the plaits flush with the folded edge of the next adjacent tube-unit. This arrangement and disposition of tube-units is carried out from the vertex of the angle of the face of the radiator backwardly to the opposite side walls of the frame of the latter, as shown in Fig. 11, and, after the face and back are dipped in the limpid solder, as previously noted, and the solder has become cold, the V-shaped surface is filed or buffed to make it perfectly smooth and clear the ends of the air tubes of surplus solder. This treatment is employed only when necessary, since by slashing the ribs or plaits, according to my invention, the necessity for filing or buffing the face of the radiator is practically avoided. The back of this V-shaped structure will have the appearance shown in Fig. 11, wherein the tube-units are shown as projecting beyond each other a uniform distance from unit to unit from the middle of the radiator, in opposite directions. This conformation at the back of the radiator has distinct functional advantages, since it presents to the atmosphere greater exposed and heat radiating surfaces in a given size structure than could possibly be obtained in any other form of radiator. Therefore, cooling is effected much more rapidly, since considerably more metal is exposed to the air.

If the plaits or ribs of the strip-units are cut perpendicularly, or at a right-angle to the length of said ribs or plaits, the grouping of the tube-units in staggered relation, as noted in the foregoing, will produce a flat front and back radiator of the usual form, as shown in Fig. 9.

Instead of cutting or slashing the ribs or plaits of the strip-units obliquely, or at a right-angle to their length, a V-shaped notch 8, may be cut therein, substantially as shown in Fig. 1, and, with a form of tube-unit, or radiator unit, having its ribs or plaits cut as just suggested, and as shown in Fig. 14, a radiator or cooler may be produced with a curved or rounded face, this being accomplished by staggering the tube-units as described with reference to Figs. 7 and 11, and subsequently filing or buffing the points of the ribs or plaits to smooth the same and give the desired rounded effect, as in Fig. 12.

The next step is to secure the ends of the tube-units to each other, this being done by turning the free end 17 of one tube-unit in one direction over against a rib or plait of an adjacent tube-unit, and then turning the other free end 18 of the first tube-unit over in the opposite direction against a rib or plait of another adjacent tube-unit, thus leaving clear and open the ends of the tubular passage 14 of each tube-unit, see Figs. 7 and 10. The free ends of the said adjacent tube-units are then turned over upon the overlapped ends just described, as shown at 19. The said overlapping ends are then soldered together so as to firmly seal and solidify the connection, the solder also entering between the overlapping parts 17, 18 and 19, as indicated at 20. An important advantage of this treatment is that interlocking and specially made joints between tube-units, or the ends of tube-units, are eliminated, thus simplifying and cheapening the construction and method of production.

Among the advantages of my invention in the structure, as well as in the method, may be noted the following:

The total weight of a given size radiator is materially reduced. The cost of manufacture is greatly reduced because of the elimination of a number of the usual expensive and laborious operations. The completed article, consequently, is very greatly reduced in cost. The radiators as a whole, as well as the radiator or tube-units, have few joints and are strong in every detail and are, consequently, well able to withstand shocks, jars, and vibration in use. A radiator made according to my invention, and tube-units or radiator-units made according to my invention, will not burst by changes in temperature resulting from freezing, since the units and the structure as a whole have greater flexibility and will yield without breaking to the expansion of the contained liquid. Another great advantage of my structure as a whole, as well as the tube or radiator-units, is that there is only one open edge or face to be closed by solder in each unit and radiator structure, as compared with two or more such faces in all other types of radiators known to me. Interlocking joints are entirely eliminated, thus eliminating mechanical operations in the building of the units and radiator structure necessary to produce the usual interlocking joints. As the result of my method of treating the strip-units, I can produce from the same strip-units either a V-shaped, or flat, or round face radiator, results impossible of accomplishment heretofore in the art. Another great advantage of my invention resides in the fact that a much greater radiating surface is exposed or produced at the back of the radiator, and the latter has, extending vertically, or from top to bottom of the structure and of the tube-units, what is, in effect, a plurality of solid solder wires joining the marginal edges of the tube-units. Another advantage resulting from my method and structure is that the water tubes of the radiator at the front of the latter have no soldered, longitudinal seams or joints, the ends of the ribs or plaits produced by slashing or cutting the strip-units being the only portions which literally have to be soldered or closed by soldering. Less solder, therefore is used on the face of the radiator, resulting in reducing another item of cost to the minimum. This feature also produces at the face of the radiator, whatever the form the latter may be given, a much neater and more uniform appearance.

Having thus described my invention, what I claim and desire to secure by Letters Patent is:

The method of making strip units for radiators, which consists in producing in a strip of flexible sheet material a plurality of plaits or ribs extending transversely of the strip and away therefrom, cutting said plaits or ribs transversely thereof from their free edges to adjacent the base of the plaits or ribs, and obliquely to the plane of the strips and bringing portions of such strips into substantially parallel opposing spaced relation to form a water tube between them, with the cut edges of the plaits or ribs of the portions lying at substantially complementary obtuse and acute angles to the edge of the unit and substantially in a common plane.

LAURENCE G. HANMER.